US012789563B2

(12) United States Patent
Kashyap et al.

(10) Patent No.: US 12,789,563 B2
(45) Date of Patent: Nov. 10, 2026

(54) VEHICLE SUSPENSION AND VEHICLE COMPRISING THE SAME

(71) Applicant: VOLVO TRUCK CORPORATION, Gothenburg (SE)

(72) Inventors: Yashaswi Kashyap, Bangalore (IN); Rakesh Lohar, Dewas (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/857,609

(22) PCT Filed: Apr. 20, 2022

(86) PCT No.: PCT/EP2022/060341

§ 371 (c)(1),
(2) Date: Oct. 17, 2024

(87) PCT Pub. No.: WO2023/202763

PCT Pub. Date: Oct. 26, 2023

(65) Prior Publication Data

US 2025/0249715 A1 Aug. 7, 2025

(51) Int. Cl.

*B60G 3/01* (2006.01)
*B60G 11/27* (2006.01)
*B60G 13/00* (2006.01)

(52) U.S. Cl.

CPC ............ *B60G 3/01* (2013.01); *B60G 13/003* (2013.01); *B60G 2204/4232* (2013.01); *B60G 2204/43* (2013.01)

(58) Field of Classification Search

CPC ...... B60G 3/01; B60G 13/001; B60G 13/003; B60G 13/005; B60G 13/006; B60G 15/00;

(Continued)

(56) References Cited

U.S. PATENT DOCUMENTS 6,273,002 B1 * 8/2001 Hachmann .............. B61F 5/144
105/199.1
8,746,383 B2 * 6/2014 Basadzishvili .......... B60G 3/01
280/124.1

(Continued)

FOREIGN PATENT DOCUMENTS

CN 102596413 B * 10/2014 ............ B02C 4/283
DE 2629518 A1 1/1978

(Continued)

OTHER PUBLICATIONS

Description Translation for DE 2629518 from Espacenet (Year: 2016).*

(Continued)

*Primary Examiner* — Daniel M. Keck

(74) *Attorney, Agent, or Firm* — Jeffri A. Kaminski; Venable LLP

(57) ABSTRACT

A vehicle suspension has a fixed portion and a movable portion configured to be movable relative to the fixed portion. The movable portion is coupled, at a predetermined part, with a shaft carrying a vehicle wheel, the fixed portion and the movable portion being movably linked via two damper devices and at least two prismatic joints so as to be able to move reciprocally one to the other along an axis. A set comprising one damper device and at least one prismatic joint is disposed opposite to another set comprising one damper device and at least one prismatic joint relative to the predetermined part.

17 Claims, 3 Drawing Sheets

(58) Field of Classification Search
CPC ............ B60G 17/00; B60G 2204/4232; B60G 2204/43
See application file for complete search history.

(56) References Cited

U.S. PATENT DOCUMENTS

| | | | | |
|---|---|---|---|---|
| 9,502,794 | B2 * | 11/2016 | Cooney | H01R 9/2408 |
| 2011/0209938 | A1 | 9/2011 | Basadzishvili | |
| 2017/0040861 | A1 * | 2/2017 | Ho | B62D 15/00 |
| 2018/0094424 | A1 * | 4/2018 | Gutierrez | E04B 1/3533 |
| 2019/0366787 | A1 | 12/2019 | Xiong et al. | |
| 2021/0268861 | A1 * | 9/2021 | Zink | B60G 17/0162 |
| 2023/0398681 | A1 * | 12/2023 | Xie | B25J 11/005 |
| 2024/0416703 | A1 * | 12/2024 | Moriarty | B60K 7/0007 |

FOREIGN PATENT DOCUMENTS

| | | | | |
|---|---|---|---|---|
| DE | 102023129658 | A1 * | 4/2025 | B60G 3/01 |
| EP | 2248690 | A2 * | 11/2010 | B60B 35/1054 |
| EP | 2576247 | B1 * | 1/2016 | B62D 7/06 |
| FR | 1136172 | A | 5/1957 | |
| JP | 4579212 | B2 * | 11/2010 | |

OTHER PUBLICATIONS

Description Translation for EP 2248690 from Espacenet (Year: 2010).*

International Search Report and Written Opinion of the International Searching Authority in corresponding International Application No. PCT/EP2022/060341 mailed Oct. 28, 2022 (10 pages).

* cited by examiner

VEHICLE SUSPENSION AND VEHICLE COMPRISING THE SAME

CROSS-REFERENCE TO RELATED APPLICATIONS

This application is a U.S. National Stage application of PCT/EP2022/060341, filed Apr. 20, 2022 and published on Oct. 26, 2023, as WO 2023/202763, all of which is hereby incorporated by reference in its entirety.

TECHNICAL FIELD

The invention relates to a vehicle suspension and a vehicle comprising such a vehicle suspension. The invention may apply to heavy-duty vehicles, such as trucks, buses and construction equipment.

BACKGROUND

On the one hand, traditional rigid vehicle suspensions transmit vibrations across the vehicle if a wheel hits a bump or unevenness due to its rigidity. This gives poor ride quality and comfort. On the other hand, traditional independent vehicle suspensions better damp vibrations. However, such suspensions usually have complex structure. In addition, the wheel moves along a curved path, which changes the geometry of the wheel (camber, caster etc.). Therefore, a need exists to provide a simple suspension having improved damping vibration capability and ensuring a stable wheel geometry.

SUMMARY

An embodiment relates to a vehicle suspension comprising a fixed portion and a movable portion configured to be movable relative to the fixed portion, the movable portion being configured to be coupled, at a predetermined part, with a shaft carrying a vehicle wheel, the fixed portion and the movable portion being movably linked via two damper devices and at least two prismatic joints so as to be able to move reciprocally one to the other along an axis (or first axis), a set comprising one damper device and at least one prismatic joint being disposed opposite to another set comprising one damper device and at least one prismatic joint relative to the predetermined part.

The fixed portion may be a portion configured to be fixed to a chassis of a vehicle, or may be a portion of a chassis of the vehicle.

The predetermined part is the part of the moving portion that is configured to be coupled with the shaft. In other words, the shaft is to be coupled to the predetermined part. The shaft may be any shaft carrying a vehicle wheel (a wheel configured to support the vehicle and to contact the ground in normal conditions). For example the shaft may be an axle, but not necessarily.

A prismatic joint is a joint comprising only one free degree of freedom in translation (i.e. linear sliding movement), the five other degrees of freedom (i.e. the two other translations and the three rotations movement) being blocked. Such a prismatic joint is also known as sliding joint or slider.

When mounted onto a vehicle and in normal use, the axis may be perpendicular to the road/ground onto which the vehicle runs. For example, the axis may be vertical or parallel to the direction of the gravity.

The damper device is a device configured to damp vibrations such as a spring or the like, a damper or the like, or any combination thereof.

The vehicle suspension may comprise two or more prismatic joints. The vehicle suspension may comprise only two damper devices, or more than two damper devices.

It is understood that the two sets are arranged on two opposite sides relative to the predetermined part. In other words, the predetermined part is disposed between the two sets.

For example, the prismatic joints and the damper devices may be arranged along a second axis, perpendicular to the axis (or first axis), and considered along the second axis, all the prismatic joints are disposed between the damper devices. It is highlighted that the prismatic joints and the damper device are not necessarily disposed onto the second axis.

Due to the prismatic joints, when the wheel hits a bump or unevenness, the movable portion/wheel only moves along the axis, while vibrations may be at least in part damped by the damper device.

Such a vehicle suspension has a simple structure, shows improved damping vibration capability, while the geometry of the wheel remains unchanged i.e. moves along a straight path parallel to the axis.

In some embodiments, each prismatic joint may comprise a rod slidably engaged in a sleeve.

The prismatic joint may comprise a silent bloc or the like between the rod and the sleeve. Such a structure may be simple and stiff enough to form a satisfactory prismatic joint in the frame of a vehicle suspension.

In some embodiments, a portion of the rod and a portion of the sleeve slidably engaged with each other and may have a circular cross section.

The cross section may be a section perpendicular to the sliding direction or to the axis. Such a cross section may help to avoid undesired blocking and prevent premature wear. In other words, this may provide a simple, efficient and reliable vehicle suspension.

In some embodiments, the vehicle suspension may comprise an even number 2N of prismatic joints, N prismatic joints being disposed opposite to each other relative to the predetermined part.

It is understood that N is an integer equal to or greater than one. For example, N may be equal to two, and the vehicle suspension may comprise four prismatic joints.

Such a structure may help to avoid undesired blocking due to its possible symmetric arrangement. In other words, this may provide a simple, efficient and reliable vehicle suspension.

In some embodiments, two first prismatic joints among the at least two prismatic joints may extend in first plane.

In the following, and unless otherwise specified, it is considered that two elements extend in a same plane if their geometric centres, for example the axis of the joints, extend in a same plane.

The plane may be parallel to the (first) axis. The plane may also be parallel to the second axis.

Such a structure may help to avoid undesired blocking by insuring a sliding movement parallel to the first plane. In other words, this may provide a simple, efficient and reliable vehicle suspension.

In some embodiments, two second prismatic joints among the 2N prismatic joints, distinct from the two first prismatic joints, may extend in a second plane, distinct from the first plane, the first plane and the second plane being parallel to each other. In some embodiments, the vehicle suspension may comprises 2N prismatic joints (N being an integer greater or equal to 1); and N distinct and parallel planes, each plane comprising two joints (i.e. two joints extending in a same plane). In other words, the planes are distinct from each other and each plane may comprise two joints belonging only to a single and same plane. This may improve the structural stiffness of the vehicle suspension, and improve the guidance capability of the movable portion/wheel along the straight path parallel to the axis. Such a structure may help to provide a simple, efficient and reliable vehicle suspension. In some embodiments, the two damper devices may extend in a third plane.

Such an arrangement of the damper device may improve the axial guidance and damping of the movable portion/wheel. In other words, this may help to provide a simple, efficient and reliable vehicle suspension.

In some embodiments, the first plane and the third plane may be distinct from each other and parallel to each other.

This may improve the structural stiffness of the vehicle suspension without compromising the damping capability. In other words, this may help to provide a simple, efficient and reliable vehicle suspension.

In some embodiments, the first plane, the second plane and the third plane may be distinct from each other and parallel to each other.

This may improve the structural stiffness of the vehicle suspension without compromising the damping capability. In other words, this may help to provide a simple, efficient and reliable vehicle suspension.

In some embodiments, the first plane and the second plane may be disposed on the same side relative to the third plane. In some embodiments, the vehicle suspension may comprise 2N prismatic joints (N being an integer greater or equal to 1) and N distinct and parallel planes, each plane comprising two joints, the N planes may be disposed on the same side relative to the plane comprising the two dampers.

This may improve the structural stiffness of the vehicle suspension without compromising the damping capability. In other words, this may help to provide a simple, efficient and reliable vehicle suspension.

In some embodiments, the movable portion may comprise a longitudinal beam.

The beam may extend along a main longitudinal axis. The beam may be straight. The beam may also have curved portion(s). The main longitudinal axis may be parallel to the second axis.

Considered along beam, the predetermined part may be disposed between the prismatic joints, and the prismatic joints may be disposed between the two damper devices. This may improve the structural stiffness of the vehicle suspension without compromising the damping capability. In other words, this may help to provide a simple, efficient and reliable vehicle suspension.

In some embodiments, the longitudinal beam may extend perpendicularly to the axis and the axis may be parallel to the plane(s).

The plane(s) mays be the first and/or the second and/or the third plane.

This may help to provide a simple, efficient and reliable vehicle suspension

In some embodiments, each damper device may comprise at least one among an air spring, a coil spring and a hydraulic cylinder.

The two damper devices may be identical, but not necessarily. This may help to provide a simple, efficient and reliable vehicle suspension.

In some embodiments, the fixed portion may comprise several brackets configured to be fixed to a chassis of a vehicle.

For example, one bracket per damper device and one bracket per joint may be provided. According to another example, the vehicle suspension may comprise four joints, one bracket per damper device and one bracket per two joints.

An embodiment relates to vehicle comprising a vehicle suspension according to any one of the embodiments of the present disclosure wherein the fixed portion is fixed to or is a portion of a chassis of the vehicle.

BRIEF DESCRIPTION OF THE DRAWINGS

With reference to the appended drawings, below follows a more detailed description of embodiments cited as examples. In the drawings.

DETAILED DESCRIPTION

Figure 1:
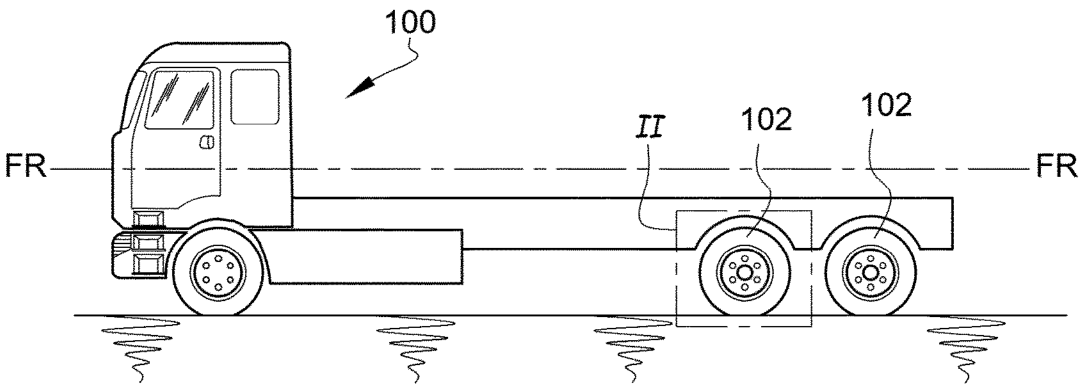
FIG. 1 shows a vehicle comprising a vehicle suspension.
Figure 2:
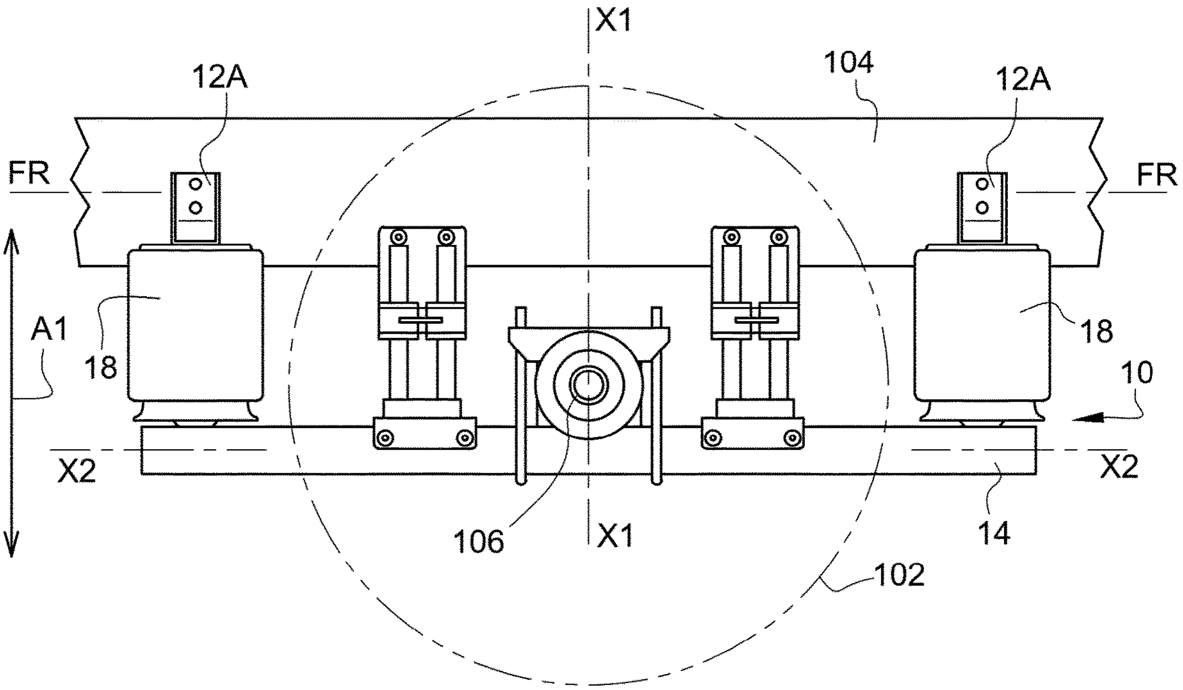
FIG. 2 shows the vehicle suspension according to the zoom II of FIG. 1.

FIG. 1 shows a vehicle 100, in the present example a heavy-duty vehicle, in this example a truck, the rear wheels 102 of which being each mounted onto a vehicle suspension 10, which is magnified in the zoom II as shown in FIG. 2.

The vehicle suspension 10 is described with reference to FIGS. 2, 3 and 6. The vehicle suspension 10 comprises a fixed portion 12 and a movable portion 14 configured to be movable relative to the fixed portion 12. The movable portion 14 is configured to be coupled, at a predetermined part 15, with a shaft 106 carrying a vehicle wheel 102. The fixed portion 12 and the movable portion 14 are movably linked via two damper devices 18 and at least two, in the present example four, prismatic joints 20, so as to be able to move reciprocally one to the other along an axis X1, as shown by the double arrow A1 of FIG. 2. A set S1 comprising one damper device 18 and at least one, in the present example a two, prismatic joints 20 is disposed opposite to another set S2 comprising one damper device 18 and at least one, in the present example two, prismatic joints 20 relative to the predetermined part 15.

The vehicle suspension 10 may comprise strictly four prismatic joints 20 and strictly two damper device 18.

The vehicle suspension 10 may comprise an even number 2N of prismatic joints 20, in the present example N equals to two, N prismatic joints 20 being disposed opposite to each other relative to the predetermined part 15.

The prismatic joint(s) 20 of each set S1, S2, may be disposed between the predetermined part 15 and a damper device 18. In other words, considered along a second axis X2 along which the predetermined part 15, the damper devices 18 and the prismatic joints 20 are arranged, the predetermined part 15 is disposed in a middle area between the prismatic joints 20, and one damper device 18 is disposed at each axial outer end of the arrangement. The second axis X2 may be perpendicular to the axis (or first axis) X1.

The arrangement of the predetermined part 15, the damper devices 18 and the prismatic joints 20 may be symmetric relative to the predetermined part 15 along the second axis X2. In other words, the vehicle suspension 10 may comprise a plane of symmetry PS, perpendicular to the second axis X2, disposed at the middle of the predetermined part 15 considered along the second axis X2, the damper devices 18 and the prismatic joints 20 being symmetrically arranged relative the plane of symmetry PS.

In the present example, two first prismatic joints 20-1 among the at least two prismatic joints 20 may extend in first plane P1. Two second prismatic joints 20-2 among the 2N prismatic joints 20, distinct from the two first prismatic joints 20-1, may extend in a second plane P2, distinct from the first plane P1, the first plane P1 and the second plane P2 being parallel to each other. The two damper devices 18 may extend in a third plane P3. The first plane P1, the second plane P2 and the third plane P3 may be distinct from each other and parallel to each other. The first plane P1 and the second plane P2 may be disposed on the same side relative to the third plane P3. The planes P1, P2 and P3 may be parallel to the axis X1 and to the second axis X2.

The planes P1, P2 and P3 may be distant from each other along a third axis X3 perpendicular to the axis X1 and to the second axis X2. The first plane P1 (or the first prismatic joints 20-1) may be distant from the second plane P2 (or second prismatic joints 20-2) along the third axis X3 of a distance D1. The second plane P2 ((or second prismatic joints 20-2) may be distant from the third plane P3 (or the damper devices 18) along the third axis X3 of a distance D2. The first plane P1 (or the first prismatic joints 20-1) may be distant from the third plane P3 (or the damper devices 18) along the third axis X3 of a distance D3=D1+D2.

The predetermined part 15 and each of the first prismatic joints 20-1 may be distant from each other along the second axis X2 of a distance L1. The predetermined part 15 and each of the second prismatic joints 20-2 may be distant from each other along the second axis X2 of a distance L2. The predetermined part 15 and each of the damper device 18 may be distant from each other along the second axis X2 of a distance L3. The first prismatic joints 20-1 may be distant from the second prismatic joint 20-2 of the same set along the second axis X2 of a distance L3=L2−L1. The first prismatic joints 20-1 may be distant from the damper device 18 of the same set along the second axis X2 of a distance L4=L3−L1. The second prismatic joints 20-2 may be distant from the damper device 18 of the same set along the second axis X2 of a distance L5=L3−L2.

It is noted that the reference point for determining the distance between different elements and/or whether they belong to the same plane may be the geometric centres of said elements (for example the axis of the prismatic joints 20 and of the damper devices 18, the centre of the predetermined part 15).

Each prismatic joint 20 may comprise a rod 20A slidably engaged in a sleeve 20B. As shown in FIG. 6, a portion of the rod and a portion of the sleeve slidably engaged with each other may have a cross section perpendicular the axis X1 that is circular. Each prismatic joint 20 may comprise a silent bloc 22.

Figure 3:
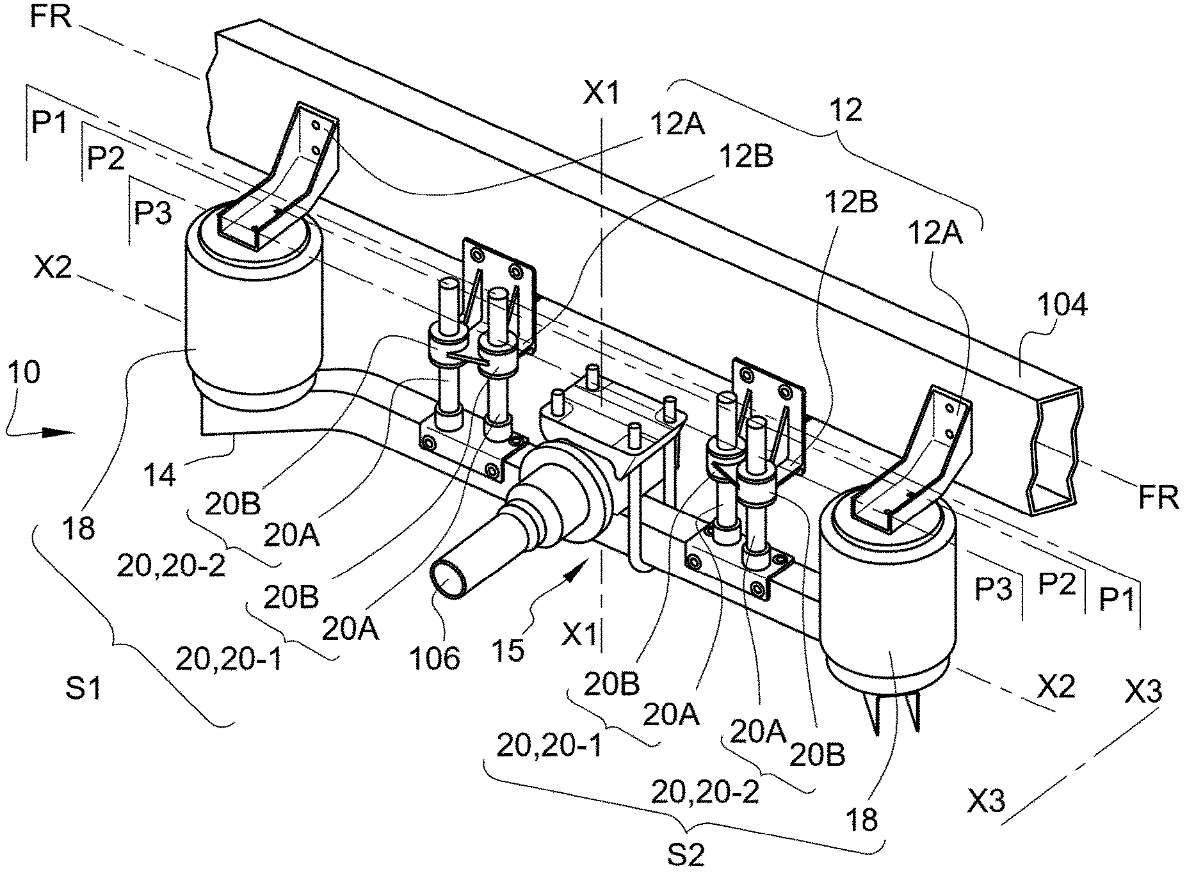
FIG. 3 shows a perspective view, without the wheel, of the vehicle suspension of FIG. 2.
Figure 4:
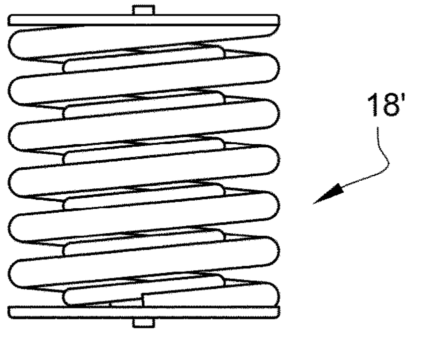
FIG. 4 shows a first variant of the damper device.
Figure 5:
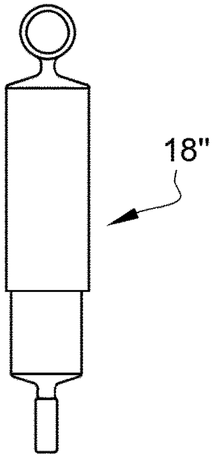
FIG. 5 shows a second variant of the damper device.
Figure 6:
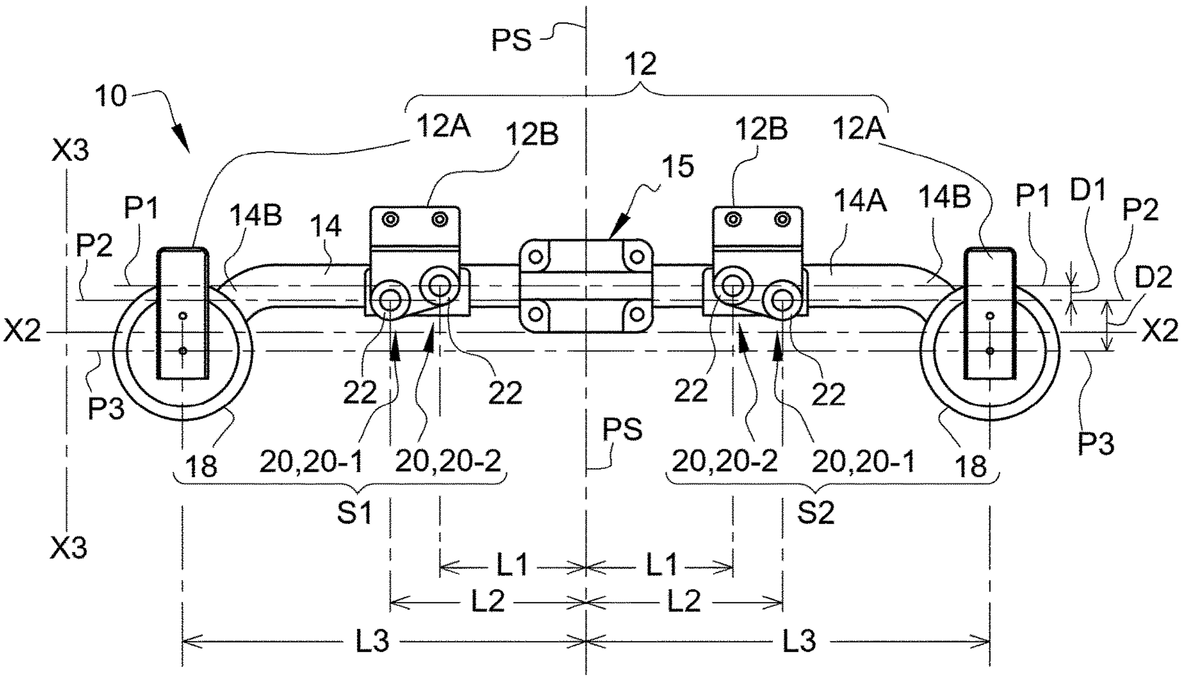
FIG. 6 shows top view perpendicular to the axis X1, along arrow VI of FIG. 2, of the vehicle suspension, without the wheel and the shaft.

As shown in FIGS. 2, 3 and 6, each damper device 18 may comprise an air spring. In a variant shown in FIG. 4, the damper device 18' may comprise a coil spring. In another variant shown in FIG. 5, the damper device 18" may comprise a hydraulic cylinder. The fixed portion 12 may comprise several brackets 12A, 12B, in the present example two brackets 12A and two brackets 12B, configured to be fixed to a chassis 104 of the vehicle 100. In a variant not shown, the brackets 12A and 12B may form parts of the chassis 104, so that the fixed portion 12 is a portion of the chassis 104.

Each bracket 12B may be configured to couple a damper device 18 to the chassis 104. Each bracket 12A may be configured to couple a prismatic joint 20 to the chassis 104. For example, the sleeve 20B of a prismatic joint 20 and a bracket 12A may form a single and same element. In the present example, the bracket 12A form a single and same element with two distinct sleeves 20B of two distinct prismatic joints 20, respectively.

The movable portion may comprise a longitudinal beam 14, which extends perpendicularly to the axis X1, along a longitudinal axis. The longitudinal axis may be parallel to or coincide with the second axis X2. In the present example, when the vehicle suspension 10 is mounted onto the vehicle 100, the second axis X2 is parallel to the forward/rearward axis FR of the vehicle 100. As shown in FIG. 6, the longitudinal beam 14 may comprise a straight main portion 14A that extends along the second axis X2, and two curved portions 14B each disposed at an axial end of the main portion 14A, and curved in the same side relative to the main portion 14A, in a plane perpendicular to the axis X1.

The prismatic joints 20 may be coupled to the main portion 14A, for example via non-referenced brackets show in FIG. 3. The non-referenced brackets of two adjacent prismatic joints 20 of a set S1, S2, may form a single and same element. Each damper device 18 may be coupled, directly or via a bracket not shown, to a single curved portion 14B.

It is to be understood that the present invention is not limited to the embodiments described above and illustrated in the drawings; rather, the skilled person will recognize that many changes and modifications may be made within the scope of the appended claims.

The invention claimed is:

1. A vehicle suspension comprising a fixed portion and a movable portion configured to be movable relative to the fixed portion, the movable portion comprising a longitudinal beam and being configured to be coupled, at a predetermined part, with a shaft carrying a vehicle wheel, the fixed portion and the movable portion being movably linked via two damper devices and at least two prismatic joints so as to be able to move reciprocally one to the other along an axis, a set comprising one damper device and at least one prismatic joint being disposed opposite to another set comprising one damper device and at least one prismatic joint relative to the predetermined part, wherein two first prismatic joints and two second prismatic joints of the at least two prismatic joints are each connected to the longitudinal beam.

2. The vehicle suspension according to claim 1, wherein each prismatic joint comprises a rod slidably engaged in a sleeve.

3. The vehicle suspension according to claim 2, wherein a portion of the rod and a portion of the sleeve slidably engaged with each other have a circular cross section.

4. The vehicle suspension according to claim 1, comprising an even number 2N of prismatic joints, N prismatic joints being disposed opposite to each other relative to the predetermined part.

5. The vehicle suspension according to claim 4, wherein the two first prismatic joints among the at least two prismatic joints extend in a first plane.

6. The vehicle suspension according to claim 5, wherein the two second prismatic joints among the 2N prismatic joints, distinct from the two first prismatic joints, extend in a second plane, distinct from the first plane, the first plane and the second plane being parallel to each other.

7. The vehicle suspension according to claim 6, wherein the two damper devices extend in a third plane.

8. The vehicle suspension according to claim 7, wherein the first plane and the third plane are distinct from each other and parallel to each other.

9. The vehicle suspension according to claim 7, wherein the first plane, the second plane and the third plane are distinct from each other and parallel to each other.

10. The vehicle suspension according to claim 7, wherein the first plane and the second plane are disposed on the same side relative to the third plane.

11. The vehicle suspension according to claim 1, wherein the longitudinal beam extends perpendicularly to the axis and the axis is parallel to one or more plane(s).

12. The vehicle suspension according to claim 1, wherein each damper device comprises at least one among an air spring, a coil spring and a hydraulic cylinder.

13. The vehicle suspension according to claim 1, wherein the fixed portion comprises several brackets configured to be fixed to a chassis of a vehicle.

14. A vehicle comprising a vehicle suspension according to claim 1, wherein the fixed portion is fixed to or is a portion of a chassis of the vehicle.

15. The vehicle suspension according to claim 1, wherein each set comprises two prismatic joints, the two prismatic joints of each set being disposed between the predetermined part and the damper device of each set along a second axis perpendicular to the axis.

16. The vehicle suspension according to claim 1, wherein, along the longitudinal beam, the predetermined part is disposed between the at least two prismatic joints, and the at least two prismatic joints are disposed between the two damper devices.

17. The vehicle suspension according to claim 1, wherein the longitudinal beam comprises a straight main portion extending along a second axis and two curved portions disposed at opposite ends of the straight main portion, the at least two prismatic joints being coupled to the straight main portion and the two damper devices being coupled to respective curved portions.

* * * * *